Patented Jan. 6, 1953

2,624,501

UNITED STATES PATENT OFFICE 2,624,501

CONTAINER HAVING WAX PRODUCT COATING

Seymour W. Ferris, Mount Holly, N. J., assignor to Sun Oil Company, Philadelphia, Pa., a corporation of New Jersey No Drawing. Application November 25, 1950, Serial No. 197,635

9 Claims. (Cl. 229—3.1)

This invention relates to a paraffin wax product. More particularly, the invention relates to a novel paraffin hydrocarbon wax product derived from petroleum which is especially suitable for coating fibrous sheets and containers used for packaging, and to a process of preparing the same.

Paraffin waxes heretofore prepared have been employed for a variety of uses, such as for the waterproofing of textiles and paper, as a component of polishes, and the like. These waxes are prepared from relatively low boiling petroleum distillate fractions by chilling, filter-pressing and sweating, and usually have a melting point within the range of 90° F. to 165° F., and a viscosity at 210° F. (Saybolt) from 35 to 50 seconds. While properties of such waxes permit their use in many applications, they are unsuitable for other uses, especially where the use involves flexibility and high tensile strength at low temperatures. For example, prior waxes are relatively brittle, hard, and non-adhesive at temperatures of 40° F. and below, and hence such waxes are unsuitable for coating fibrous fluid containers which are maintained at low temperatures, since under such conditions the wax tends to crack or peel, thus exposing the container to the action of moisture or liquid. In order to overcome these and other difficulties, it has heretofore been necessary to compound paraffin waxes with foreign materials such as rubber, microcrystalline wax, beeswax, resins, and the like, to yield a composition sufficiently flexible for use at such low temperatures. Such compositions, however have not proved entirely satisfactory since the components of such compositions may adversely affect food materials which they contact, and achievement of one desirable property is insufficient to render the composition suitable for the intended purpose and may be obtained at the expense of other desirable properties. Also, the compounding of special compositions may be difficult and prohibitively expensive.

An object of the present invention is to provide a novel petroleum hydrocarbon paraffin wax which is flexible and has a remarkably high tensile strength, especially at relatively low temperatures, and which possesses other novel properties, as hereinafter described. Another object is to provide a paraffin wax possessing properties which obviates the necessity of compounding foreign materials therewith to obtain a product suitable for coating fibrous fluid containers. A further object is to provide a process for the preparation of a paraffin wax especially suitable for coating fibrous milk containers. Other objects appear hereinafter.

It has now been discovered that a novel paraffin wax characterized by high tensile strength, flexibility, adherence to paper, and other novel properties, as hereinafter described, may be prepared from petroleum slack wax.

The wax of the present invention has a melting point of from 125° F. to 132° F., a viscosity of about 37 to 41 (Saybolt Universal at 210° F.), a penetration at 77° F. of about 21 (ASTM method D5-25), an oil content of less than 1%, and boils between 400° F. and 650° F. at 10 mm. of mercury pressure, the wax being completely distillable at this pressure. The present wax has a tensile strength of about 250 p. s. i. at 70° F., and in direct contrast to usual paraffin waxes, the tensile strength increases at 40° F. to about 280 p. s. i.

The wax of the present invention is prepared from petroleum, and it is essential, in order to obtain the desired wax, that certain critical variables be observed, as hereinafter described. To illustrate the present process, a slack wax obtained as a by-product from the de-waxing of lubricating oils, and which contains about 30% oil, is subjected to vacuum distillation and a distillate fraction boiling between about 325° F. and 650° F. at 10 mm. of mercury pressure is separated. This fraction is dissolved in a solvent, preferably a mixture of methyl ethyl ketone and benzene in about equal volumes, dissolution being at a temperature of from about 165° F. to 195° F. The solution is slowly cooled from the temperature of dissolution to from 75° F. to 80° F., and the precipitated wax separated, such as by filtering or centrifuging. The resulting filtrate is further cooled to a temperature of from 25° F. to 30° F., and the precipitated wax filtered. This latter filtered wax, on further treatment, forms the wax of the present invention. It is preferred to wash the wax cake, either by washing the filter cake or by repulping and subsequent filtration, using as the washing material the solvent employed in the dissolution of the wax. Also the washing operation is preferably conducted at the temperature of the final precipitation, namely, from 25° F. to 30° F.

In the distillation step, components boiling outside the range of from about 325° F. to 650° F. at 10 mm. must be excluded from the distillate, or else the wax will be of unsuitable viscosity and decreased tensile strength, and other properties are adversely affected.

As above stated, the preferred solvent for dissolution of the wax distillate from vacuum distillation is a mixture of about equal parts by volume of methyl ethyl ketone and benzene. Volume ratios of the solvents may vary of from 4:1 to 1:4, from 4:6 to 6:4 being especially suitable. This solvent has a preferential solvent power for the oil of the present paraffin distillate fraction, and hence is effective in removing a substantial proportion of the oil from the wax. Either of the components of the solvent may be replaced, in whole or in part, by other ketones, such as methyl butyl ketone or acetone, or hydrocarbons or halogenated hydrocarbons such as ethylene dichloride, pentane, and hexane, or alcohols such as propyl or the heptyl alcohols.

After dissolution of the wax, the solution is cooled to about 78° F., the precipitated wax removed, the solution further cooled to about 28° F., and the wax thereby precipitated is recovered and further treated to produce the wax product of the invention. The temperatures stated for both precipitations must be closely observed in order to obtain the present wax. The use of temperatures outside of the stated ranges results in the production of a wax having properties different from those of the present wax, which properties render the product unsuitable for coating in accordance with the present invention.

The wax obtained in the first filtration, and the filtrate from the second filtration, may be employed to prepare other wax products the properties of which are drastically different from the properties of the wax of the present invention.

The temperatures stated are used in conjunction with the preferred solvent, as above described. Other solvents exhibit a different solvency for the wax, i. e. the components of the wax precipitate from different solvents at different temperatures. Accordingly, the present wax product is obtained only when the same components are precipitated as when using the present preferred solvent at the defined temperatures. For example, using a solvent composed of materials other than methyl ethyl ketone and benzene may require that one or both, usually both, of the temperatures of precipitation be considerably different than herein defined. Accordingly, the proper temperature ranges must be determined in the event solvents other than the preferred solvents, herein described, are employed.

The following examples illustrate the preparation, properties, and uses of the present novel wax:

EXAMPLE

Slack wax obtained from the de-waxing of lubricating oil was charged to a vacuum still and the fraction boiling from 325° F. to 650° F. at 10 mm. of mercury pressure was separated. One part of the so-obtained wax, at the rate of 1,200 barrels per day, was dissolved in 5.5 parts by volume of solvent at a temperature of 190° F. The solvent employed was a mixture of methyl ethyl ketone and benzene in substantially equal parts by volume. The solution was cooled at relatively slow rate to about 80° F. and the precipitated wax filtered.

The filtrate obtained was further cooled to about 30° F., and the wax precipitated at this temperature filtered. The filter cake was then repulped with 3 parts of the same solvent per part by volume of wax, and the slurry was filtered at about 30° F. The filter cake was washed with 1.7 parts of the same solvent, per part of wax, at a temperature of about 30° F. Solvent was removed from the wax by distillation and steam stripping.

The wax yield based on the 325° F.–650° F. fraction, obtained by filtration at 30° F., was 42.5%. The wax product had the following properties; properties of the most pertinent waxes heretofore known are included for comparison:

Table I

|  | Typical paraffin waxes | | |
|---|---|---|---|
|  | Present wax | 128–130° F. AMP grade | 133–135° F. AMP grade |
| Oil content (ASTM D721-49T) | 0.5 | 0.9 | 0.5 |
| Melting point (°F.) (ASTM D87-42) | 129 | 127 | 135 |
| Penetration at 77° F. (ASTM D5-25) | 21 | 19 | 16 |
| Viscosity at 210° F. (S. U. S.) (ASTM D446-39) | 39 | 37 | 38 |
| Tensile strength (70° F. p. s. i.) | 250 | 96 | 188 |
| Tensile strength (40° F. p. s. i.) | 280 | 28 | 22 |
| Flash (° F.) (ASTM D93-46) | 425 | | |
| Color, Saybolt (ASTM D156-38) | +25 | +27 | +27 |

From the above data it is apparent that, while the present wax resembles prior waxes in many properties, the tensile strength is greatly superior, and instead of decreasing at lower temperatures, in the range of 70° F. to 40° F., the tensile strength actually increases. Tensile strength in this example, and where mentioned throughout the specification, was determined by standard techniques using the Perkins tensile tester. The reason for the unique properties of the present wax is not known with certainty, and it is not desired to be limited by theoretical considerations. It is believed, however, that the preparation of a wax in strict accordance with the present specification results in a wax product composed of a certain combination of hydrocarbons, not heretofore achieved, which impart such properties to the wax.

In order to illustrate what is believed an important difference in the present wax from those heretofore known, the melting points of the present wax and of typical waxes are compared with the melting points of the highest boiling 10% fractions thereof, in the following Table II:

Table II

|  | Present wax | Wax A[1] | Wax B[2] | Wax C[3] |
|---|---|---|---|---|
| Melting point (° F.) | 129 | 134 | 127 | 123 |
| Melting point of highest boiling 10% fraction (° F.) | 137 | 152 | 149 | 140 |
| Difference (° F.) | 8 | 18 | 22 | 17 |

[1] A fully refined paraffin wax heretofore used for coating milk containers.
[2] A blend of paraffin wax and microcrystalline wax especially prepared for coating milk containers.
[3] A fully refined paraffin wax heretofore used for coating milk containers.

In order to achieve the advantages of the present invention, the difference in melting points, as expressed in Table II, should not be greater than 12° F.

As above described, the present wax has a tensile strength of about 250 p. s. i. at 70° F. which increases to about 280 p. s. i. at 40° F. The tensile strength may, of course, vary somewhat from the stated values, and may vary at 70° F. to from 225 to 275 p. s. i., and may vary at 40° F. to from 275 to 325 p. s. i. However, the tensile strength at 40° F. is always at least 25 p. s. i. higher than the tensile strength at 70° F., and usually is within the range of 30 to 60 p. s. i. higher at the lower temperature.

The present wax is primarily intended for use in coating fibrous fluid containers, particularly cardboard milk containers, which may be advantageously accomplished by dipping or spraying the containers in or with molten wax, and no odor or taste is imparted to milk by the wax. The present wax may be used in many other applications, especially where high tensile strength and extreme flexibility and adherence is desirable, such as in the coating of metal fluid containers, canvas impregnation, coating paper drinking cups, and the like.

The invention claimed is:

1. A hydrocarbon paraffin wax derived from petroleum having a melting point of from 125° F. to 132° F., a tensile strength at 40° F. of from 275 p. s. i. to 325 p. s. i., the tensile strength at 40° F. being at least 25 p. s. i. higher than the tensile strength at 70° F.

2. A hydrocarbon paraffin wax derived from petroleum having a melting point of from 125° F. to 132° F., a tensile strength at 70° F. of about 250 p. s. i., and a tensile strength at 40° F. of about 280 p. s. i.

3. A hydrocarbon paraffin wax derived from petroleum having a melting point of from 125° F. to 132° F., a tensile strength at 70° F. of about 250 p. s. i., and a tensile strength at 40° F. of about 280 p. s. i., said wax being completely distillable within the temperature range of from 400° F. to 650° F. at 10 mm. of mercury pressure.

4. A hydrocarbon paraffin wax according to claim 2 wherein the melting point of the highest boiling 10% fraction thereof is less than 12° F. above the melting point of the wax.

5. A hydrocarbon paraffin wax according to claim 3 wherein the oil content is less than 1%.

6. Process for the preparation of a wax product having predetermined properties which comprises subjecting a slack wax to vacuum distillation, separating a distillate fraction boiling between 325° F. and 650° F. at 10 mm. of mercury pressure, dissolving said fraction in a solvent at a temperature of from 165° F. to 195° F., said solvent comprising a mixture of methyl ethyl ketone and benzene in approximately equal volumes, cooling the so-formed solution to a temperature of from 75° F. to 80° F. whereby a portion of the dissolved wax is precipitated, separating said precipitated wax from the solution, further cooling the solution to a temperature of from 25° F. to 30° F. whereby an additional portion of the dissolved wax is precipitated, separating said precipitated wax, washing the last named separated wax with said solvent at a temperature of from 25° F. to 30° F., and removing solvent from said wax.

7. Process for the preparation of a wax product having predetermined properties which comprises subjecting a slack wax to vacuum distillation, separating a distillate fraction boiling between 325° F. and 650° F. at 10 mm. of mercury pressure, dissolving said fraction in a solvent at a temperature of from 165° F. to 195° F., said solvent comprising a mixture of methyl ethyl ketone and benzene in volume ratio of 1:4 to 4:1, cooling the so-formed solution to a temperature of from 75° F. to 80° F. whereby a portion of the dissolved wax is precipitated, separating said precipitated wax from the solution, further cooling the solution to a temperature of from 25° to 30° F. whereby an additional portion of the dissolved wax is precipitated, separating said precipitated wax, washing the last named separated wax with said solvent at a temperature of from 25° F. to 30° F., and removing solvent from said wax.

8. A container for packaging milk formed from a fibrous sheet material and provided with an adherent moisture and liquid resistant coating, said coating being formed from a hydrocarbon paraffin wax derived from petroleum, said wax having a melting point of from 125° F. to 132° F., a tensile strength at 70° F. of about 250 p. s. i., a tensile strength at 40° F. of about 280 p. s. i., an oil content of less than 1%, and being completely distillable within the temperature range of from 400° F. to 650° F. at 10 mm. of mercury pressure.

9. A container for packaging milk formed from a fibrous sheet material and provided with an adherent moisture and liquid resistant coating, said coating being formed from a hydrocarbon paraffin wax derived from petroleum, said wax having a melting point of from 125° F. to 132° F., a tensile strength at 70° F. of between 225 and 275 p. s. i. and a tensile strength at 40° F. at least 25 p. s. i. higher than the tensile strength at 70° F., an oil content of less than 1%, and being completely distillable within the temperature range of from 400° F. to 650° F. at 10 mm. of mercury pressure.

SEYMOUR W. FERRIS.

REFERENCES CITED

The following references are of record in the file of this patent:

UNITED STATES PATENTS

| Number | Name | Date |
|---|---|---|
| 1,921,860 | Bahlke | Aug. 8, 1933 |
| 1,937,518 | Henderson et al. | Dec. 5, 1933 |
| 2,127,668 | Adams et al. | Aug. 23, 1938 |
| 2,229,658 | Jenkins | Jan. 28, 1941 |
| 2,361,582 | Adams et al. | Oct. 31, 1944 |
| 2,399,521 | Tyler | Apr. 30, 1946 |